Patented Dec. 30, 1930

1,787,080

UNITED STATES PATENT OFFICE

ROBERT B. MacMULLIN AND MAURICE C. TAYLOR, OF NIAGARA FALLS, NEW YORK, ASSIGNORS TO THE MATHIESON ALKALI WORKS, INC., OF NEW YORK, N. Y., A CORPORATION OF VIRGINIA

METHOD OF PRODUCING A NEW HYPOCHLORITE COMPOSITION

No Drawing. Original application filed August 16, 1928, Serial No. 300,148, and in Germany May 11, 1929. Divided and this application filed March 6, 1930. Serial No. 433,803.

This invention relates to improvements in the production of calcium hypochlorite compositions. This application is a division of our copending application filed August 16th, 1928, Serial Number 300,148.

We have found that under regulated conditions in a system containing Na, Ca, OCl, and Cl ions there can be obtained an entirely new triple salt which, so far as we are aware, has not heretofore been known. It is a triple salt having a composition corresponding to the formula $Ca(OCl)_2.NaOCl.NaCl.12H_2O$. It is easily identified not only by analysis but also by its crystalline form and optical properties. The crystals belong to the hexagonal system and appear as right hexagonal prisms with each edge bevelled. The crystals are anisotropic when viewed from the side and isotropic when viewed from the end.

We have studied the aqueous equilibrium in the system including the four ions Na, Ca, OCl and Cl and have found that the new triple salt can be produced by different methods of procedure.

For example, if sodium chloride is added to a saturated solution of calcium hypochlorite at temperatures of about 16° C. or lower and the solution seeded with crystals of the triple salt, a large yield of the crystals of this triple salt is obtained.

The proportions in the example just given can be somewhat varied, it being important to have the four ions together in sufficient concentration and at a sufficiently low temperature so that the new triple salt will be obtained in a stable form.

The new triple salt is comparatively stable up to a temperature of about 22° C., at or about which temperature it undergoes a transformation into its constituent salts or hydrated salts. The transformation is apparent to the eye or the touch as the crystals then lose their shape and become pasty. When cooled again the new triple salt forms but slowly. While we have described the salt as comparatively stable at temperatures below 22° C., it nevertheless appears to undergo a slow decomposition with evolution of oxygen and some chlorine, much as does sodium hypochlorite under similar conditions. The crystals of the new salt can, however, be dried at a low temperature without great decomposition and if kept below 22° C. with preservation of the general outlines of the crystals during the drying process, giving a product which is somewhat granular in form and lighter in density than the hydrated crystals.

The new triple compound or salt can itself be employed for example for bleaching purposes, as where it is to be used at the place it is produced or before it has had an opportunity of undergoing decomposition. In order to protect it against decomposition it should be maintained at a low temperature.

The new triple salt forms a valuable intermediate product for use in the preparation of a stable calcium hypochlorite final product. We have found that the sodium hypochlorite content of this new triple salt can be converted into calcium hypochlorite to form a final calcium hypochlorite product admixed with sodium chloride. The tendency of the new triple compound to decompose appears to be due to the sodium hypochlorite which it contains in its crystalline structure. Sodium hypochlorite either hydrated or anhydrous is known to be chemically unstable under similar conditions. We have found, however, that the sodium hypochlorite can be eliminated from these crystals without appreciable loss of active chlorine by replacing the sodium of the sodium hypochlorite with calcium to give a final product containing approximately twice as much calcium hypochlorite as sodium chloride. In the final calcium hypochlorite product the active chlorine is in a stable form and the product is a valuable product in other respects as will be hereinafter described.

We have found that the new triple compound above described can be converted into a final stable calcium hypochlorite product by treating it with a chlorinated lime solution or slurry containing an amount of calcium chloride chemically equivalent to the sodium hypochlorite in the crystals. The chlorinated lime solution or slurry can be obtained by the chlorination of milk of lime.

We claim:

The method of producing a new hypochlorite compound which comprises adding sodium chloride to a saturated solution of calcium hypochlorite at a low temperature to form a triple salt of calcium hypochlorite, sodium hypochlorite and sodium chloride in crystalline form.

In testimony whereof we affix our signatures.

ROBERT B. MacMULLIN.
MAURICE C. TAYLOR.